united States Patent Office 3,036,886
Patented May 29, 1962

3,036,886
PROCESS FOR THE PRODUCTION OF
PARAPERIODIC ACID
Ulrich Brandli, Hedingen, Zurich, Switzerland, assignor to Elektrochemie Turgi, Turgi, Aargau, Switzerland
No Drawing. Filed Jan. 10, 1961, Ser. No. 81,673
Claims priority, application Germany Jan. 29, 1960
7 Claims. (Cl. 23—152)

This invention relates to a process for the production of crystalline paraperiodic acid.

During the last years paraperiodic acid gained increasing importance as a valuable oxidizer in the field of qualitative and quantitative analytical chemistry as well as in preparative chemistry. The known cleavage of $\alpha,\beta$-dihydroxy compounds by periodic acid is used for quantitative determination of glycols and related substances as well as for the preparation of compounds containing one or more aldehyde groups. For example, from starch a polymer dialdehyde is produced in industrial scale by use of periodic acid solutions. Further, starting with tartaric acid very pure glyoxylic acid may be obtained by oxidation with periodic acid. However, because of the difficulties encountered with its preparation, up to now paraperiodic acid was used predominantly for analytical purposes only. In contrast to the periodates usually employed, e.g. sodium paraperiodate, sodium metaperiodate and potassium metaperiodate as well as to lead tetraacetate, periodic acid shows various advantages: it is more soluble in water; further, after the oxidation being accomplished, the reduction product as well as excess of the acid itself may be completely removed from the reaction mixture by simple means (e.g. as barium iodate or periodate). The latter property is very important for use in preparative chemistry, especially with respect to the production of lightly soluble compounds, the purification of which as is known is very difficult.

It is an object of the present invention to provide a process for the production of paraperiodic acid by which said acid may be obtained in high yields from easily available starting materials. A further object is the provision of paraperiodic acid in a highly pure state and in any desired quantity.

Prior processes for the preparation of paraperiodic acid generally are not very suited for use on industrial scale. The reaction of silver salts with chlorine or bromine (Ullmanns Encyclopädie der techn. Chemie, 3rd edition (1957), vol. 9, page 138) is rather cumbersome; further, since the silver salts are relatively expensive, this process is uneconomical. The reaction of barium periodate with sulfuric acid to yield periodic acid can but be achieved incompletely, and by use of lead periodate and sulfuric acid substantial amounts of iodic acid are produced as by-product (Gmelin, Vol. Jod, 5th ed., page 523). Industrial production of paraperiodic acid in the past was effected primarily by electrolytical oxidation of iodic acid. However, by use of lead/lead dioxide anodes and sulfuric acid as catholyte, the resulting periodic acid is contaminated by sulfuric acid, from which it is difficult to be separated. By carrying out the electrolysis with platinum anodes covered with lead dioxide and nitric acid as catholyte (Willard, Ralston, Trans. Electrochem. Soc., 62 (1932), 239), nitric acid can be easily removed from the reaction mixture by distillation and therefore does not affect the recovery of crystalline periodic acid. However, the acid obtained by this process proves to be unstable due to traces of colloidal platinum metal originating from the electrode material, which metal catalyses the decomposition of the acid.

According to another known process, pure crystalline paraperiodic acid may be obtained by reaction of barium paraperiodate with concentrated nitric acid (Willard, Inorganic Syntheses (New York, 1939), vol. I, pages 169–171). This process is almost satisfactory in laboratory scale, however, but when carried out with industrial charges shows various deficiencies. The provision of barium paraperiodate of sufficient purity is difficult, since this salt, because of its slight solubility, is always obtained in a finely divided state and thus, for purification from adhering ions, requires laborious methods. Further, barium nitrate resulting from the reaction of barium periodate with nitric acid also is obtained in very finely divided form and for purification from adhering periodic acid repeatedly must be slurried in nitric acid.

According to the present invention, the disadvantages encountered with the processes of the prior art may be avoided. Further, paraperiodic acid may be produced in a simple and economic way.

The process of the present invention comprises reacting potassium metaperiodate with perchloric acid to yield potassium perchlorate and paraperiodic acid according to the following scheme:

$$KIO_4 + HClO_4 \cdot 2H_2O = KClO_4 + H_5IO_6$$

Since potassium metaperiodate in water is only slightly soluble, the reaction will proceed to completeness only if special measures are applied.

One of these measures is the addition of a strong non-oxidisable and volatile acid, e.g. nitric acid. By this feature the solubility of potassium metaperiodate is substantially increased while the solubility of potassium perchlorate remains nearly unchanged. In addition, low temperatures and moderate concentrations are favourable reaction conditions. In presence of nitric acid for instance, with decreasing temperatures the solubility of potassium metaperiodate decreases only slightly, while the solubility of potassium perchlorate decreases substantially. Therefor, by cooling to low temperatures not only is the reaction equilibrium further shifted to the right side of the above scheme, but the amount of potassium present in the solution is substantially decreased. The use of solutions of too high concentration should be avoided, since the solubility of potassium metaperiodate in concentrated solutions decreases in an undesirable manner. If the reaction is carried out in dilute nitric acid and adequate cooling of the reaction mixture to between about $+50°$ C. and $-50°$ C., and preferably to about $-10°$ C., is effected prior to the separation of potassium perchlorate by filtration, from 95 to 100% of of the original potassium metaperiodate may be transferred into paraperiodic acid. Perchloric acid should be used in excess of 5 to 10% over the stoichiometric amount.

The present process provides various advantages:

(1) Potassium metaperiodate used as starting material especially with regard to its $IO_4^-$-content (99% $H_5IO_6$) is the cheapest periodate. Either by reaction of sodium paraperiodate with potassium nitrate, or directly from iodine, potassium hydroxide and chlorine it is easily available in high purity. Further, perchloric acid recently is obtained in a favorable and economic way by electrolytical oxidation of chlorine.

(2) The by-product of the present process is potassium perchlorate which is obtained in crystalline state and can easily be freed from adhering periodic acid by washing with water. The proceeds from the sale of this by-product meet the expenses for the starting perchloric acid as produced by the above stated process, whereby the process of the present invention becomes especially favorable with view to the economy.

(3) The reaction may be carried out in simple vessels. Paraperiodic acid attacks nearly all metals and, besides, destroys many plastics and elastomers by oxidation. Accordingly, the construction of adequate reaction vessels comprising heating and cooling means would create great problems with regard to container-materials. Especially those plastics which are not attacked by periodic acid solutions, such as polyethylene and polyvinyl chloride, possess minor thermal conductivity and besides, at temperatures above 80° C. they are softening. It is an outstanding advantage of the present process that the reaction proceeds at temperatures below 60° C. and that no external heating must be applied. The cooling to e.g. −10° C. may be effected by addition of ice. The reaction may be carried out in simple open containers made of polyethylene, polyvinyl chloride or ceramics and by use of charges of any desired quantity.

*Example*

In a 150 l. vessel made of polyethylene, PVC or ceramics, 40 kg. (174 moles) of pure crystalline $KIO_4$ were slurried with a solution of 13 kg. of conc. nitric acid (sp. g.=1.4) and 30 l. of distilled water. Then 31 kg. of 60% perchloric acid (186 moles of $HClO_4$) were added (if desired, minor amounts of water may be used and correspondingly greater amounts of ice). The reaction mixture having attained room temperature is agitated and 30 kg. of pure ice are introduced to decrease the temperature to about −10° C. The resulting precipitate substantially consisting of $KClO_4$ is removed by filtration, preferably by use of a centrifuge. The filtrate containing about 450 to 500 g. of paraperiodic acid per litre and only some hundred milligrams of potassium per litre is evaporated by use of a water-jet vacuum. Immediately prior to crystallisation the solution which by some precipitated $KIO_4$ became slightly turbid is filtered once more and evaporated. The reaction mixture is preferably diluted in a manner as to obtain a product containing from 100 to 1000 g., preferably about 450 g., of paraperiodic acid per litre of solution.

Paraperiodic acid absolutely free of potassium may be obtained by first evaporating the filtrate regardless of precipitated $KIO_4$ to a very small volume to yield crude paraperiodic acid which after separation from the mother liquors by centrifuging is dissolved in a little volume of cold distilled water. Insoluble $KIO_4$ is removed by filtration and the filtrate is once more evaporated to crystallise the pure paraperiodic acid. The mother liquors of the pure acid are once more evaporated to yield crude acid, while the mother liquors of the crude acid containing perchloric acid are added to a subsequent charge. By this procedure the yield of paraperiodic acid is nearly 100% of theory. Further, the perchloric acid is reacted completely.

The crystalline paraperiodic acid obtained by the process of the present invention may be dried in a vacuum oven at 50° to 60° C. It is snow-white and contains but traces of iodic acid. It is identical in all respects with purest samples obtained by other procedures.

I claim:
1. A process for the production of paraperiodic acid, which comprises reacting potassium metaperiodate with perchloric acid in an aqueous phase to yield a precipitate consisting substantially of potassium perchlorate, while the paraperiodic acid is contained in the aqueous phase, separating the precipitate consisting substantially of potassium perchlorate from the reaction mixture and evaporating the remaining aqueous solution of paraperiodic acid.

2. A process according to claim 1, which comprises adding a strong non-oxidisable and volatile acid to the reaction mixture.

3. A process according to claim 1, which comprises cooling the reaction mixture prior to the separation of said potassium perchlorate to temperatures of from about +50° C. to about −50° C.

4. A process according to claim 3, which comprises diluting the reaction mixture in a manner as to obtain a product containing from 100 to 1000 g. of paraperiodic acid per liter of solution.

5. A process according to claim 3, which comprises diluting the reaction mixture in a manner as to obtain a product containing about 450 g. to 500 g. of paraperiodic acid per liter of solution.

6. A process according to claim 3, in which the step of cooling the reaction mixture is effected by addition of ice.

7. A process for the production of paraperiodic acid, which comprises adding perchloric acid to potassium metaperiodate slurried in a mixture of about 13 parts by weight of conc. nitric acid and 30 parts by weight of water, the perchloric acid being in the form of a 60% aqueous solution, while controlling the reaction temperature not to exceed room temperature, adding ice to the reaction mixture to decrease the temperature to about −10° C., removing the resulting precipitate consisting substantially of $KClO_4$ by filtration, evaporating the filtrate until slight turbidity appears, filtering the slightly turbid mixture and evaporating the filtrate to obtain pure paraperiodic acid, the molar ratio of potassium metaperiodate to perchloric acid being about 174 to about 186.

References Cited in the file of this patent

J. W. Mellor's "A Comprehensive Treatise on Inorganic and Theoretical Chemistry," vol. 2, 1922 ed., pages 387–389 and 392, Longmans, Green & Co., N.Y.

Supplement II, Part 1, to Mellor's Book, page 901 (1956 ed.) Longmans, Green & Co., N.Y.

Jour. Indian Chem. Soc., vol. 30, No. 2, 1953, page 143.